Nov. 3, 1942.    J. C. COWING    2,300,653
EXPANSIBLE ANCHORING DEVICE
Filed Feb. 8, 1941
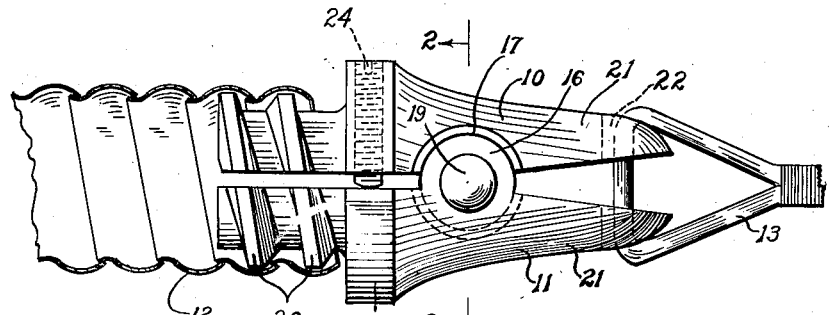
FIG. 1.
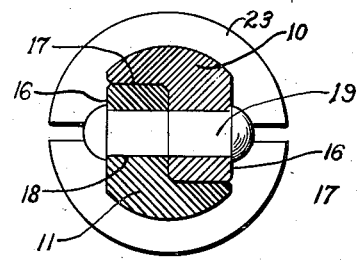
FIG. 2.
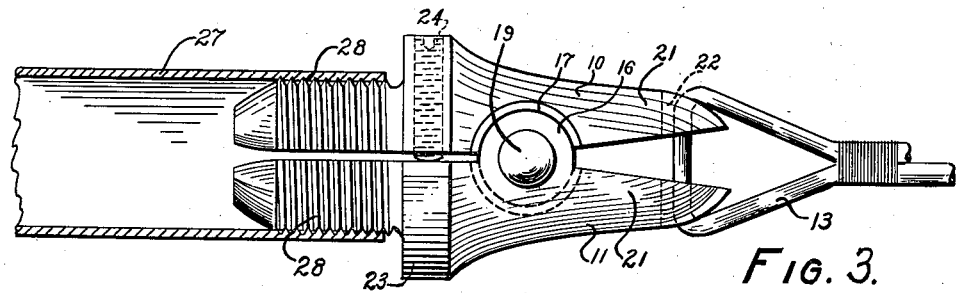
FIG. 3.
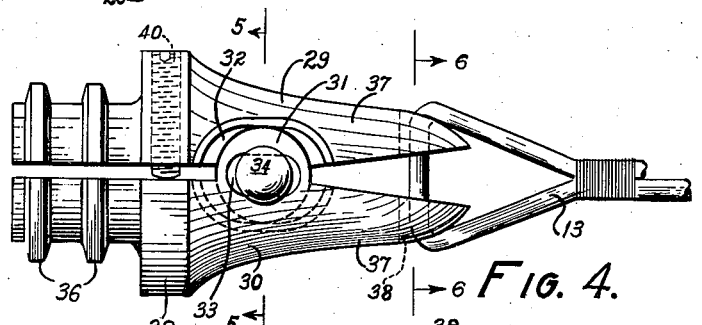
FIG. 4.
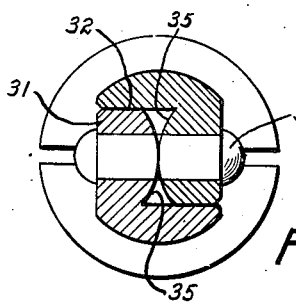
FIG. 5.
FIG. 6.
INVENTOR.
BY Jay C. Cowing
Stradling and Krost, attys Patented Nov. 3, 1942

2,300,653

UNITED STATES PATENT OFFICE 2,300,653

EXPANSIBLE ANCHORING DEVICE

Jay C. Cowing, East Cleveland, Ohio

Application February 8, 1941, Serial No. 378,113

6 Claims. (Cl. 24—249.1)

My invention relates to anchoring devices and more particularly to expansible anchoring devices for gripping the interior surface of an opening in an object and connecting same to a pull cord or wire or cable.

An object of my invention is the provision of an anchoring device constructed of similar gripping members.

Another object of my invention is the provision of causing the pull cord to constrain the anchoring device outwardly against the opening in the object which is engaged by the anchoring device.

Another object of my invention is the provision of establishing a relationship where the greater the pull upon the pull cord the tighter the anchoring device engages the internal surface of the opening in the object being engaged by the anchoring device.

Another object of my invention is the provision of pivotally connecting the gripping members together so that the pivotal connection provides for giving relative lateral turnable movement between the gripping members to give in effect a lead to the threads.

Another object of my invention is the provision of an anchoring device having gripping threads of substantially zero lead.

Another object of my invention is the provision of an anchoring device having gripping members of identical construction in which the gripping threads of the gripping members have substantially zero lead.

Other objects and a fuller understanding of my invention may be had by referring to the following description and claims, taken in conjunction with the accompanying drawing, in which:

Figure 1 represents a side longitudinal view of an anchoring device embodying the features of my invention;

Figure 2 is a cross-sectional view taken along the line 2—2 of Figure 1;

Figure 3 is a side longitudinal view of a modified form of my invention;

Figure 4 is a further modified form of my invention;

Figure 5 is a cross-sectional view taken along the line 5—5 of Figure 4, and

Figure 6 is a cross-sectional view taken along the line 6—6 of Figure 4.

With reference to Figures 1 and 2 of the drawing, my anchoring device comprises two similarly constructed gripping members 10 and 11 which are adapted to expansibly engage the internal surface of a flexible conduit or armored cable 12. The construction of the flexible conduit or armored cable 12 is such as to give in effect internal threads which may be engaged by my anchoring device. In the illustrated embodiment of my invention my anchoring device is adapted to connect a suitable pull cord 13 to the flexible conduit or armored cable 12 such, for example, as employed in the construction and wiring of buildings or any other suitable field of use. The pull cord 13 may be a wire or flexible cable or any other tension device. As illustrated, the two gripping members 10 and 11 are hingedly connected together, in which the construction for each gripping member is the same. The hinge construction comprises a hinge boss 16 on one side of each gripping member and a hinge socket 17 on the other side. The hinge bosses 16 of the gripping members 10 and 11 fit into the hinge sockets 17 and form a hinge connection. Each of the hinge bosses 16 of the two gripping members 10 and 11 have a pivotal opening 18 extending therethrough, in which is mounted a pivot pin 19 for securing the two gripping members 10 and 11 hingedly together. The arrangement of my hinge connection is such that substantially all of the load is carried by the engagement between the hinge boss 16 and the hinge socket 17 and accordingly very little of the load is carried by the pivot pin 19. The function of the pivot pin is designed principally to secure the two gripping members 10 and 11 together.

As shown in Figure 1, the left-hand ends of each of the gripping members 10 and 11 are provided with gripping threads 20 which are adapted to complementarily engage the internal surface of the flexible conduit or armored cable 12. The right-hand ends of the gripping members 10 and 11 are provided with spaced arms 21 through which extend connection openings 22 to receive the pull cord 13. The action of the pull cord in passing through the connection openings 22 is such that under tension the pull cord tends to constrain the two spaced arms 21 together. The constraining of the spaced arms 21 together causes the gripping threads 20 to be urged outwardly against the inside surface of the flexible conduit or armored cable 12 to make a good strong gripping connection between my gripping or anchoring device and the flexible conduit or armored cable 12. The greater the pull upon the pull cord 13 the tighter the gripping threads 20 engage the internal surface of the flexible conduit or armored cable 12. The spacing between the two gripping members 10 and 11 is sufficient to permit the easy insertion of the gripping threads 20 within the internal surface of the flexible conduit or armored cable 12. A shoulder 23 is provided between the gripping threads 20 and the hinge connection to constitute a stop against which the connecting device may be inserted within the flexible conduit or armored cable 12. Positioned within the shoulder 23 is a set screw 24 which may be conveniently turned to urge the gripping threads 20 outwardly against the internal surface of the flexible conduit. The separating force effected by the action of the set screw is in addition to that effected by the pull cord tending to constrain the gripping threads apart. The surface of the gripping members upon the right-hand side of the shoulder and leading up to the shoulder is tapered so as to remove all possibility of the gripping members catching upon obstructions in the building as the pull cord 13 draws the armored cable or flexible conduit 12 through a wall or other portion of the building.

In Figure 3 I show a modification of my anchoring device in that the gripping members are provided with machine-like threads 28 and are adapted to engage the internal surface of a pipe 27, which may be a copper pipe as used in modern plumbing installations for buildings. The machine-like threads 28 may be hardened so that by properly adjusting the set screw 24 the anchoring device may be arranged to cut the threads internally of the copper pipe 27 without the use of any additional pipe threading device. The construction and operation of the device shown in Figure 3, except for the provision of the machine-like threads 28, is the same as that shown and described in Figures 1 and 2, and like parts are designated by like reference characters. The device in Figure 3 finds particular utility in guiding copper pipes around a bend or past any other obstruction where it is difficult to feed the pipe without the employment of a suitable pull cord or cable.

In Figures 4 and 5 I show a further modification of my invention in that the gripping members 29 and 30 are adapted to move laterally relative to each other in addition to the rocking movement effected by the hinge connection. The two gripping members 29 and 30 are identical in construction and have gripping threads 36 of substantially zero lead. In inserting the device in Figure 4 within a flexible conduit or armored cable such as shown in Figure 1, the two gripping members 29 and 30 are twisted laterally relative to each other to give in effect a lead to the threads 36 so that the threads tend to complementarily engage the thread-like surfaces within the flexible conduit or armored cable. The hinge construction comprises semi-circular hinge bosses 31 which fit into oval hinge sockets 32. In addition, the pivotal opening 33 which extends through the hinge bosses is oval and receives a round pivot pin 34. As shown in Figure 5, the adjacent engaging surfaces 35 between the hinge bosses is curved or spherical so that the entire arrangement of the hinge connection functions to provide relative lateral movement between the two gripping members 29 and 30 to give in effect a lead to the gripping threads 36. The construction of the spaced arms 37, the connection opening 38, and the shoulder 39 and the set screw 40 in Figure 4 is the same as the spaced arms 21, the connection opening 22, the shoulder 23 and the set screw 24 as shown in Figures 1 and 3.

As illustrated in Figure 6, the connecting openings through which the pull cord 13 passes are in straight alignment when a pulling force is exerted upon the pull cord 13. The action of the pull cord in Figure 4 tending to urge the connecting openings 38 in straight alignment tends to twist the gripping threads 36 back into straight alignment which gives an additional binding effect to the threads 36 within the flexible conduit or armored cable in addition to that effected by the forceably spreading of the gripping threads 36 within the flexible conduit or armored cable. That is to say, the device in Figure 4 gives a double gripping action within the flexible conduit or armored cable by reason of the fact that the gripping threads 36 tend to bind or cock themselves within the flexible conduit or armored cable, in addition to the gripping action afforded by the forceable separation of the gripping threads outwardly against the internal surface of the flexible conduit or armored cable.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention

1. An expansible anchoring device for gripping the interior surface of an opening in an object and connecting same to a pull cord comprising, in combination, two hingedly connected gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping members hingedly together, said gripping member being provided on one side of the hinge connection with gripping threads having a pitch lead adapted to fit into the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms.

2. An expansible anchoring device for gripping the interior surface of an opening in an object and connecting same to a pull cord comprising, in combination, two hingedly connected gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping hingedly together, said gripping member being provided on one side of the hinge connection with gripping machine-like threads adapted to cut threads upon the inside surface of the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms and set screw means engaging the gripping members for also forcing the gripping threads outwardly against the opening in the object.

3. An expansible anchoring device for gripping the interior surface of an opening in an object and connecting same to a pull cord comprising, in combination, two hingedly connected gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping members hingedly together, said hinge bosses fitting loosely in said sockets, and said pivot means fitting loosely in said pivot opening to provide relative lateral turnable movement between the gripping members to give in effect a lead to the threads, said gripping member being provided on one side of the hinge connection with gripping threads adapted to fit into the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms.

4. An expansible anchoring device for gripping the interior surface of an opening in an object and connecting same to a pull cord comprising, in combination, two hingedly connected gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping hingedly together, said hinge bosses fitting loosely in said sockets, and said pivot means fitting loosely in said pivot opening to provide relative lateral turnable movement between the gripping members to give in effect a lead to the threads, said gripping member being provided on one side of the hinge connection with gripping threads of substantially zero lead and adapted to fit into the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms.

5. An expansible anchoring device for gripping the interior surface of an opening in an object and connecting same to a pull cord comprising, in combination, two hingedly connected gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping hingedly together, said hinge bosses and said pivot means being substantially circular, and said sockets and said pivotal opening being substantially oval, all functioning to provide relative lateral turnable movement between the gripping members to give in effect a lead to the threads, said gripping member being provided on one side of the hinge connection with gripping threads adapted to fit into the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms.

6. An expansible anchoring device for gripping the interior surface of an opening in an object and connecting same to a pull cord, comprising, in combination, two hingedly connecting gripping members of similar construction, each of said members having intermediate its ends a hinge boss on one side and a hinge socket on the other side, the hinge bosses of the gripping members fitting into the sockets and forming a hinge connection, each of said bosses having a pivotal opening extending therethrough, pivot means extending through the pivotal opening and securing the two gripping hingedly together, said hinge bosses fitting loosely in said sockets, and said pivot means fitting loosely in said pivotal opening to provide relative lateral turnable movement between the gripping members to give in effect a lead to the threads, said gripping member being provided on one side of the hinge connection with gripping threads adapted to fit into the said opening of the object, said gripping member being provided on the other side of the hinge connection with two spaced arms each having connection means to which the pull cord may be attached, said two spaced arms being constrained together and the gripping threads being urged outwardly against the opening in the object by the force of the pull cord acting upon the two spaced arms, said gripping threads being also constrained laterally relative to each other by the force of the pull cord acting upon the two spaced arms.

JAY C. COWING.